(12) United States Patent
Campbell

(10) Patent No.: US 7,021,414 B2
(45) Date of Patent: Apr. 4, 2006

(54) BIRDCAGE BEARING ASSEMBLY AND SUSPENSION CONNECTION FOR A HIGH PERFORMANCE VEHICLE

(76) Inventor: Wayne Campbell, 620 W. Main St., Sedalla, MO (US) 66301

( * ) Notice: Subject to any disclaimer, the term of this patent is extended or adjusted under 35 U.S.C. 154(b) by 194 days.

(21) Appl. No.: 10/396,905

(22) Filed: Mar. 25, 2003

(65) Prior Publication Data

US 2004/0188993 A1 Sep. 30, 2004

(51) Int. Cl.
*B60K 17/30* (2006.01)

(52) U.S. Cl. .................. 180/254; 280/86.751; 180/258; 180/259; 301/105.1

(58) Field of Classification Search ................ 280/756, 280/757, 86.5, 86.75, 86.751; 180/253, 254, 180/258, 259; 301/105.1
See application file for complete search history.

(56) References Cited

U.S. PATENT DOCUMENTS

| 4,019,824 | A | * | 4/1977 | Percy | 403/261 |
| 4,294,326 | A | * | 10/1981 | Fry | 180/255 |
| 4,331,210 | A | * | 5/1982 | Petrak | 180/384 |
| 6,017,097 | A | * | 1/2000 | Weir, III | 301/105.1 |
| 6,637,944 | B1 | * | 10/2003 | Sahashi et al. | 384/544 |
| 6,729,769 | B1 | * | 5/2004 | Sahashi et al. | 384/537 |

* cited by examiner

Primary Examiner—Ruth Ilan
Assistant Examiner—Toan C To
(74) Attorney, Agent, or Firm—Artz & Artz, PC

(57) ABSTRACT

A birdcage assembly for a high performance vehicle includes a birdcage having an opening defined by an inner periphery. The birdcage is secured to a rear suspension of the vehicle and is maintained in a substantially vertical position. The opening is intended to receive a vehicle axle therethough. The opening has a bearing located therein, which includes an inner race, an outer race, and a plurality of rollers disposed between the inner race and the outer race. The inner race of the bearing is in communication and rotates with the vehicle rear axle. Further, the bearing is moveable with respect to the birdcage such that as the axle deviates from an orientation parallel to ground, the bearing can move with respect to the birdcage away from a vertical position. The floating aspect of the bearing with respect to the birdcage minimizes side loads on the birdcage are thus prolongs the life of the bearing.

18 Claims, 4 Drawing Sheets

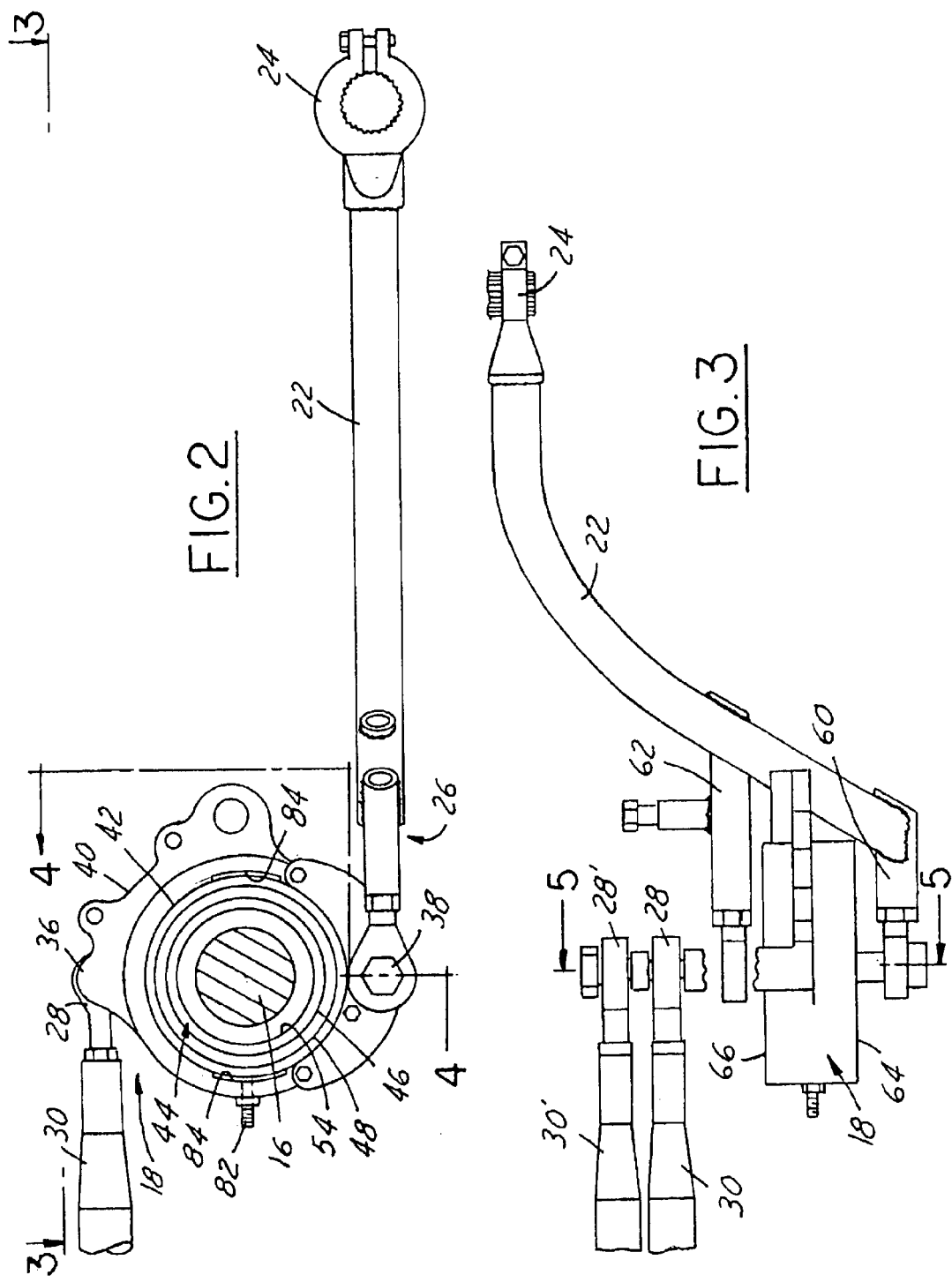

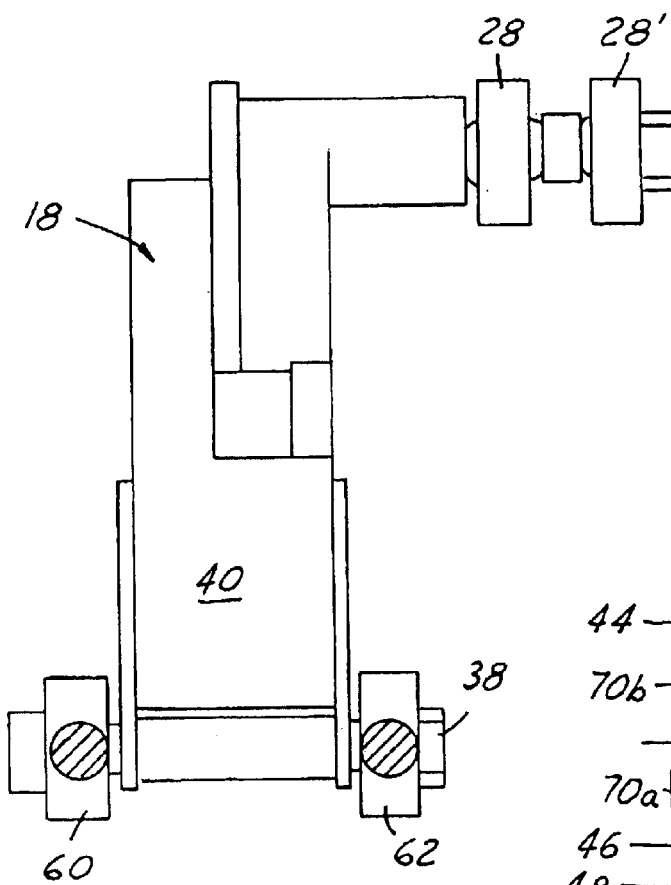
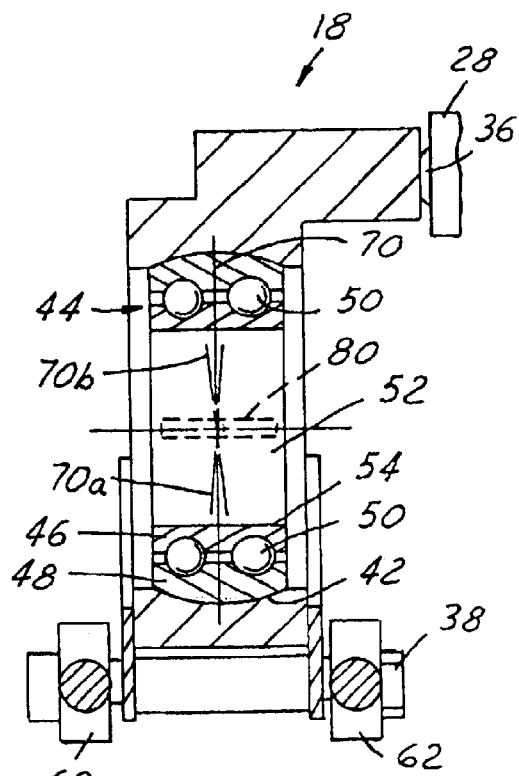
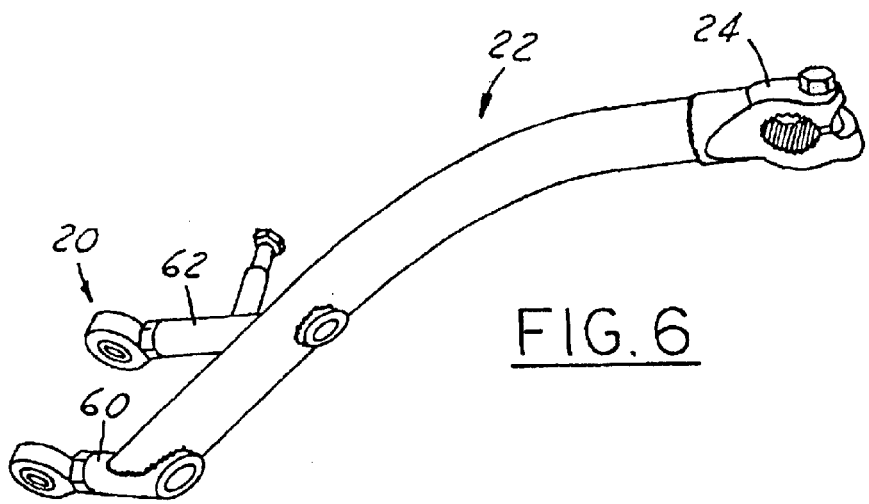

BIRDCAGE BEARING ASSEMBLY AND SUSPENSION CONNECTION FOR A HIGH PERFORMANCE VEHICLE

TECHNICAL FIELD

The present invention relates generally to a birdcage bearing assembly. More particularly, the present invention relates to a birdcage bearing assembly for high performance vehicles that provides prolonged bearing life and improved vehicle performance.

BACKGROUND OF THE INVENTION

Birdcages are typically used in connection with the rear axles of high performance vehicles, such as race cars or sprint cars. Typically, the birdcages are located on either side of the vehicle and support a respective bearing structure. Each of the bearing structures communicates with an opposing end of the vehicle rear axle. This engagement between the bearings and the rear axle allows the rear axle to drive the rear wheels.

As the bearings within the birdcage support and communicate with a rotating structure to provide power to the rear wheels, timing of the birdcage is critical to proper vehicle performance and bearing longevity. It is well known that timing a birdcage means locating it vertically with respect to the ground (or as close to vertical as possible) to align the upper and lower birdcage bolts. Proper timing of the birdcage prevents uneven side-to-side loading on the radius rods during acceleration of the vehicle and the rear axle. As is known, timing is accomplished by adjusting the length of the connection of the torsion arm rod (at the bottom) and the length of the radius arm (at the top) to obtain verticality of the birdcage.

One common method for timing the birdcages includes raising the vehicle by positioning blocks under the rear lower frame rails and the rear axle to simulate the desired ride heights. This method also takes into account any stagger that may exist. Locating the chassis at the correct ride height prevents the unwanted variance of the angles of the two attaching arms. Once the vehicle has been properly elevated, the torsion bars on each side of the vehicle are disconnected. Thereafter, the radius rod length at the left rear is adjusted to properly orient the left rear birdcage in a vertical position. As will be appreciated by one of ordinary skill in the art, a carpenter's square and level is appropriate to assist in obtaining the desired vertical alignment of the birdcage. Alternatively, a birdcage level tool, such is made and sold by MPD Racing Products, may be utilized. Once the left rear birdcage is vertically aligned, the right rear birdcage must also be vertically aligned. Typically, at this point, the left and right sides are rechecked to ensure that they have not been moved out of alignment. Similarly, at this point, the axle squareness to the motor plate is also typically rechecked.

Once these components are all properly aligned, the left rear torsion arm is hooked up to the vehicle suspension while the left rear birdcage is maintained in a vertical position. Both sides are then again rechecked. If both birdcages are still vertical and the axle is still square to the motor plate, the right rear torsion arm is hooked up to the vehicle suspension while the right rear birdcage is maintained in a vertical position. Both sides are then again rechecked. As will be understood, while this process can result in the desired properly aligned chassis, it requires considerable time and effort.

Once the birdcages are timed, the squareness of the rear end to the motor plate is again rechecked as timing the birdcages can cause the axle orientation to change. If this occurs, the axle must be squared and the birdcages must be retimed. This is why typical processes recommend ensuring that the rear axles are square at each step as the arms are hooked up to the birdcages.

Once the birdcages are installed, the associated bearings located within each birdcage are subjected during use to significant side loads, particularly on the rear driver's side tire because of the angle or banking of the track as the vehicle is being driven. This side load or axial load exerts force, which is created by the movement of the axle with respect to the stationary birdcage and bearing. This movement of the axle in the bearing can cause the bearing to wear quickly and prematurely, as the bearing is being driven forwardly by the rotation of the axle. This is true regardless of the alignment of the birdcage. Moreover, because the bearing race is being subjected to both a forward and a side force, its operation can be inefficient, which can affect vehicle performance and driveability. Additionally, the bearing on the rear suspension can bind altogether in response to those side loads.

It would therefore be desirable to provide a birdcage assembly including a bearing that minimizes these problems, including bearing inefficiency and bind.

SUMMARY OF THE PRESENT INVENTION

Accordingly, it is an object of the present invention to provide a birdcage assembly including a bearing for a high performance vehicle that minimizes the effect of any side loads on the birdcage and the bearing during operation of the vehicle.

It is a related object of the present invention to provide a birdcage assembly for use with a rear suspension system for a racecar that can more efficiently accommodate side loads on the bearing as the racecar is being driven.

It is another object of the present invention to provide a birdcage assembly for a high performance vehicle, which reduces wear on an associated bearing and thus prolongs the life of the bearing.

It is a further object of the present invention to provide a birdcage assembly for a high performance vehicle that essentially eliminates side loads on an associated bearing.

It is still another object of the present invention to provide a birdcage assembly for a high performance vehicle that can maintain more accurate vertical alignment with respect to the ground and the rear suspension.

It is yet another object of the present invention to provide a birdcage assembly that minimizes bind of the rear axle and the rear suspension.

In accordance with the above and the other objects of the present invention, a birdcage assembly for a high performance vehicle is provided. The birdcage assembly includes a birdcage having an opening defined by a substantially circular inner periphery. The birdcage is secured to a rear suspension of the vehicle and is maintained in a substantially vertical position. The opening is intended to receive a vehicle axle therethough. The opening has a bearing located and retained therein. The bearing includes an inner race, an outer race, and a plurality of rollers disposed between the inner race and the outer race. The outer race has a substantially circular outer periphery in communication with the substantially circular inner periphery of the birdcage. The inner race of the bearing is in communication and rotates with the vehicle rear axle. The outer periphery of the bearing outer race is moveable with respect to the inner periphery of the birdcage such that as the axle deviates from an orientation parallel to ground, the bearing can move away from a vertical position with respect to the birdcage. This floating aspect of the bearing with respect to the birdcage minimizes side loads on the birdcage are thus prolongs the life of the bearing.

Additionally, the birdcage assembly includes a plurality of heim joints that secure the birdcage to the rear suspension of the vehicle. The heim joints are located at one end of the radius arm and help maintain the birdcage in a generally vertical position. At least one of the heim joints is secured to an outer side of the birdcage assembly and another of the heim joints is secured to an inner side of the birdcage assembly. The connection of the heim joints to either side of the birdcage assembly allows the birdcage to remain generally vertical while the bearing moves with respect to the real axle. The double heim joint hook-up to the birdcage assembly provides a double sheer-type hook-up.

These and other features and advantages of the present invention will become apparent from the following description of the invention, when viewed in accordance with the accompanying drawings and appended claims.

BRIEF DESCRIPTION OF THE DRAWINGS

FIG. 2 is a front view of a birdcage assembly in accordance with one embodiment of the present invention;

FIG. 3 is a top view of the birdcage assembly of FIG. 2 in the direction of the arrows 3—3;

FIG. 4 is a partial cross-sectional view from the side of the birdcage assembly of FIG. 2 in the direction of the arrows 4—4;

FIG. 5 is a cross-sectional view of the birdcage assembly of FIG. 3 in the direction of the arrows 5—5;

FIG. 6 is a perspective view of a radius arm with a pair of heim joints for attaching a birdcage assembly to a vehicle rear suspension in accordance with one embodiment of the present invention;

DETAILED DESCRIPTION OF THE PREFERRED EMBODIMENTS

Figure 1:
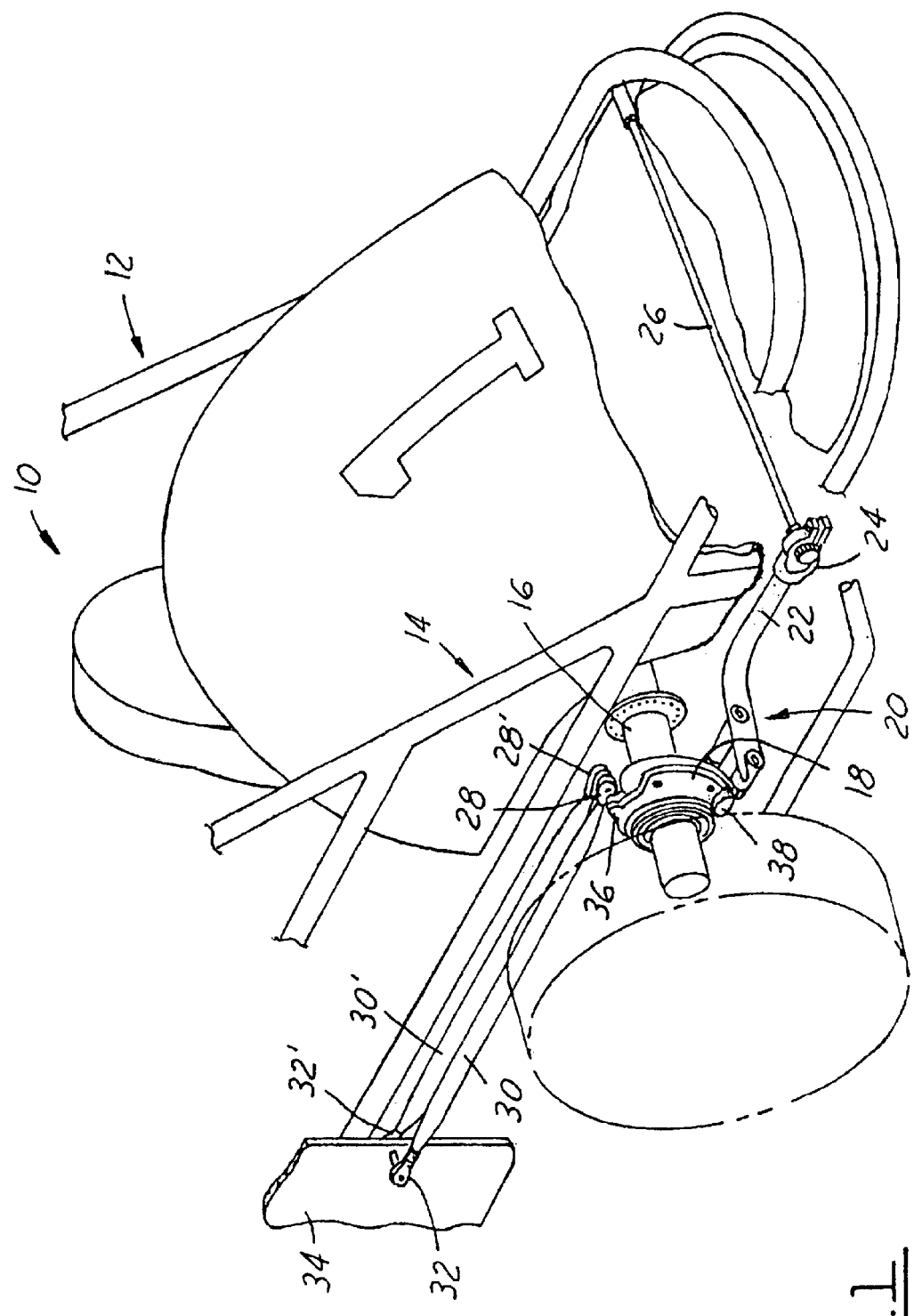
FIG. 1 is a schematic illustration of a rear suspension of a high performance vehicle including a birdcage assembly in accordance with one embodiment of the present invention is disposed.
Figure 7:
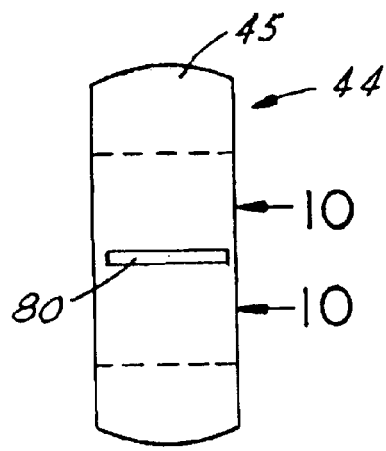
FIG. 7 is a side view of a bearing for a birdcage assembly in accordance with one embodiment of the present invention.

Referring now to FIG. 1, which schematically illustrates a vehicle 10 and, more particularly, illustrates a rear portion 12 of the vehicle. The illustrated vehicle 10 into which the present invention is intended to be incorporated can be any type of vehicle that is prone to bind of the bearing and the rear suspension. Accordingly, the vehicle is preferably a high performance vehicle, such as a race car. In one embodiment, the high performance vehicle is a sprint car. However, it will be understood that the present invention may be incorporated into a variety of other vehicles, including a variety of different race cars or high performance vehicles.

The rear portion 12 of the vehicle 10 includes a rear chassis 14, including a rear suspension system. The rear portion 12 also includes a rear axle 16 that is driven by the engine (not shown). The rear axle 16 is in communication at either end with a respective birdcage 18. Only one end of the rear axle 16 and only the left rear birdcage 18 are shown. However, it will be understood that the relationship between the other end of the rear axle 16 and the right rear birdcage is the same. As shown, the birdcage 18 is secured to a first end 20 of a torsion arm 22. The torsion arm 22 has a second end 24 secured to a torsion bar 26 at the back of the vehicle 10. The torsion arm 22 holds up the rear suspension system. The birdcage 18 is secured to a first end 28 of a first radius arm 30 and a first end 28' of a second radius arm 30'. The radius arms 30, 30' extend forwardly and are connected at a respective second end 32, 32' to the vehicle frame 34 or other suitable structure. The utilization of two radius rods 30, 30' provides increased stability for the birdcage 18. As will be understood by one of ordinary skill in the art, the birdcage 18 is properly positioned or tuned when the centerline of the top bolt 36, which secures the radius arms 30, 30' to the birdcage 18, is in line with the centerline of the lower bolt 38, which secures the torsion arm 22 to the birdcage 18.

Referring now to FIGS. 2 through 6, which illustrate one embodiment of the birdcage 18 in accordance with the present invention. The birdcage 18 includes an outer peripheral surface 40 and an inner peripheral surface 42. The inner surface 42 defines an opening 52 which receives a bearing 44. The outer surface 45 of the bearing 44 contacts the inner surface 42 of the birdcage 18. The bearing 44 includes an inner race 46, an outer race 48, and a plurality or rollers 50 disposed between the inner race 46 and the outer race 48. The rollers 50 allow the inner race 46 to rotate with respect to the outer race 48. In one embodiment, the rollers 50 are balls. However, it will be understood that rollers in various different shapes and configurations may be utilized, including, for example, tapered rollers. The inner surface 42 is sized to receive and retain the bearing 44 as is described in more detail below. It will be understood that a variety of other methods for securing the bearing 44 within the birdcage 18 may be utilized.

The inner race 46 has an interior surface 54 that defines an opening 56 for receiving an end of the rear axle 16. The interior surface 54 of the inner race 46 contacts the rear axle 16, such that as the rear axle 16 rotates, the inner race 46 rotates. It is known that as a vehicle, such as a race car or high performance vehicle is driven, the vehicle 10 is subjected to significant forces such as inertial forces. This is particularly true if the vehicle is being driven on a banked race track where the inertia forces are even more significant. These inertial forces are imparted on the wheel and cause the rear axle 16 to move from a position generally parallel to the ground to a position that is not parallel to the ground. In other words, the rear axle 16 moves from a position where it is generally perpendicular to the birdcage 18 to a position where the rear axle 16 is not generally perpendicular to the birdcage 18.

As the birdcage 18 is intended to remain substantially vertical to the ground, this displacement or movement of the rear axle 16 from that orientation causes side loads or axial forces to be exerted on the bearing 44 and the birdcage 18. This creates a significant amount of pressure and can cause the bearing 44 to bind due to the bearing rollers 50 rolling on the race walls, instead of between the raceways. This pressure can also cause the rear suspension to bind. Additionally, these forces also cause increased stress on both the bearing 44 and the birdcage 18.

In accordance with one embodiment of the present invention, the bearing 44 is in floating engagement with the birdcage 18. In other words, the bearing 44 can swivel or move with respect to the birdcage 18, as shown best in FIG. 4. As shown in FIG. 4, the bearing 44 has a centerline 70, which moves as the bearing moves. As the bearing 44 moves inward, the centerline also moves as generally designated by reference number 70a. As the bearing 44 moves outward, the centerline also moves as generally designated by reference number 70b. As set forth above, the birdcage 18 is intended to remain in a substantially vertical orientation with respect to the ground. However, as shown, the bearing 44 is free to move with the rear axle 16, instead of remaining in the same vertical orientation as the birdcage 18. Accordingly, as the rear axle 16 is moved from its normally parallel position with respect to the ground, the bearing 44 moves therewith. The bearing 44 thus has two degrees of freedom and can move in response to side loads while the birdcage 18 remains essentially vertical. This movement of the bearing 44 with the rear axle 16 ensures that the rollers 50 run straight in the bearing races. The bearing 44 and the rear axle 16 can operate completely independent of the forces acting on the birdcage 18. However, the birdcage 18 obviously still controls the location of the axle 16, just not the orientation of the rear axle 16 with respect to ground parallelism.

This floating bearing 44 helps minimize the effect of any axial or load forces on the bearing 44 or the birdcage 18 and eliminates the bind from the vehicle 10. Because the bearing 44 can move with the rear axle 16, the rollers 50 always run between the raceways, instead of on the sides of the raceways. This thus eliminates the bind and prolongs the life of the bearing 44. Additionally, because of the ability of the bearing 44 to move with respect to the birdcage 18, the bearing 44 is intended to operate efficiently in all circumstances of use. Accordingly, the performance of the vehicle 10 is enhanced.

As set forth above, it is important to orient the birdcage 18 in a substantially vertical configuration when it is assembled to the vehicle 10. Further, it is also important to maintain the substantially vertical configuration of the birdcage 18 during use. In accordance with one embodiment, the torsion arm 22 includes a double heim hook up as disclosed in more detail below.

As shown in FIGS. 5 and 6, the first end 20 of the torsion arm 22 includes an outboard portion 60 and an inboard portion 62. The outboard portion 60 and the inboard portion 62 are each secured to the birdcage 18 by the lower bolt 38. The outboard portion 60 is located on the outer side 64 of the birdcage 18 and the inboard portion 62 is located on the inner side 66 of the birdcage 18. The lower bolt 38 passes through the outboard portion 60 of the first end 20 then through the birdcage 18 and then through the inboard portion 62 of the birdcage 18. This configuration provides a double sheer type hook up between the torsion arm 22 and the birdcage 18. The connection of the lower bolt 38 to both the outboard portion 60 and the inboard portion 62 only permits the birdcage 18 to move vertically.

Referring now to FIGS. 7 through 10, which illustrate the components of the birdcage assembly, namely the birdcage 18 and the bearing 44 and the assembly of these two components. As shown best in FIGS. 7 and 10, the bearing 44 includes an elongated slot 80 formed in its outer surface 45. The elongated slot 80 is intended to receive a retaining mechanism 82 therein. In one embodiment, the retaining mechanism 82 passes through the outer peripheral surface 40 of the birdcage 18 and through the inner surface 42 of the birdcage 18 and into engagement with the elongated slot 82. The retaining mechanism 82 is preferably a nut and screw. However, any other suitable retaining mechanism may be utilized.

The retaining mechanism 82 and the slot 80 act to secure the outer race 48 of the bearing 44 and prevent rotational movement thereof when the rear axle 16 rotates. The elongated slot 80, however, allows the bearing 44 to float. The movement of the bearing 44 inwardly and outwardly with respect to the birdcage 18 is limited by the length of the elongated slot 80. The retaining mechanism 82 also secures the bearing 44 within the birdcage 18. Also, any other suitable mechanism for securing the bearing 44 within the birdcage 18 may be utilized.

Figure 8:
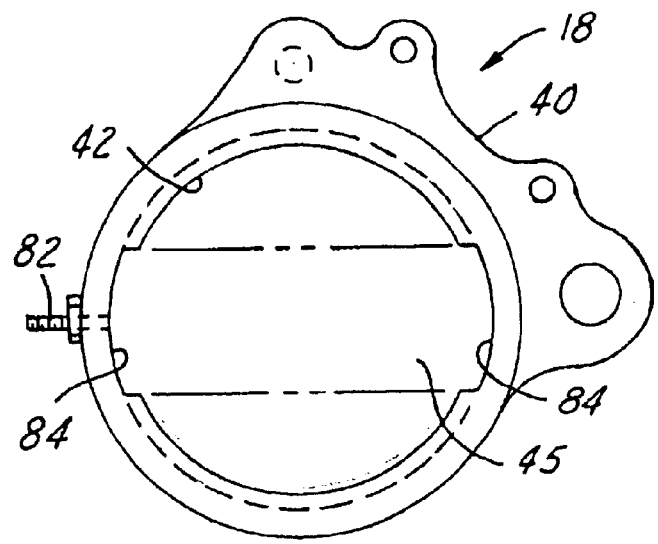
FIG. 8 is a front view illustrating the assembly of a bearing with a birdcage assembly in accordance with one embodiment of the present invention.
Figure 9:
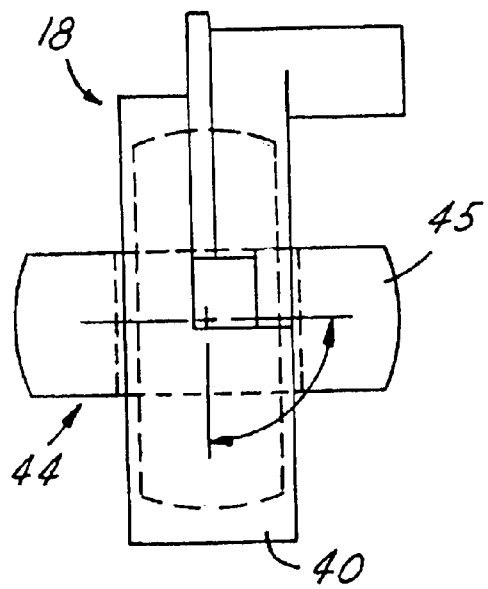
FIG. 9 is a top view illustrating the assembly of a bearing with a birdcage assembly in accordance with one embodiment of the present invention.
Figure 10:
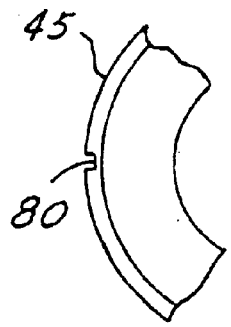
FIG. 10 is a broken away view of the bearing of FIG. 7 in the direction of the arrows 7—7.

FIGS. 8 and 9 illustrate a preferred method of inserting the bearing 44 into the birdcage 18. The birdcage 18 includes a pair of opposing notches 84 formed in the outer side 64 and the inner side 66 thereof. To insert the bearing 44 into the birdcage 18, the bearing 44 is positioned in the birdcage such that it engages the notches 84 and such that the slot 80 is oriented adjacent the retaining mechanism, as shown in FIG. 8. Once the bearing 44 is in the position shown in FIG. 8, it is pivoted 90 degrees until the outer surface 45 of the bearing 44 is in engagement with the inner surface 42 of the birdcage 18. Thereafter, the torsion arm 22 and the radius arms 30, 30' can be attached to the birdcage 18 and the birdcage 18 can be secured and tuned to the vehicle.

Having now fully described the invention, it will be apparent to one of ordinary skill in the art that many changes and modifications can be made thereto without departing from the spirit or scope of the invention as set forth herein.

What is claimed is:

1. A birdcage assembly for a high performance vehicle, comprising:
    a birdcage having an opening defined by an inner periphery, said opening intended to receive a vehicle rear axle therethough, said birdcage secured to a rear suspension of the vehicle and being maintained in a generally vertical position with respect to ground;
    a bearing disposed in said opening, said bearing including an inner race, an outer race, and a plurality of rollers disposed between said inner race and said outer race;
    said inner race of said bearing in rotational communication with said vehicle axle;
    said bearing being free to move with respect to said birdcage in response to displacement of said vehicle rear axle from a normal position that is parallel to ground;
    whereby side loads on said birdcage are minimized.

2. The birdcage assembly of claim 1 wherein said birdcage is secured to a first end of a torsion arm, said torsion arm extending rearward and being secured to the vehicle at a second end.

3. The birdcage assembly of claim 2 wherein said first end of said torsion arm includes a outbound portion and an inbound portion with said outbound portion being located adjacent an outer side of said birdcage and said inbound portion being located adjacent an inner side of said birdcage.

4. The birdcage assembly of claim 3 wherein said outbound portion and said inbound portion are secured to said birdcage by a single bolt.

5. The birdcage assembly of claim 1 wherein said bearing is a ball bearing and said plurality of rollers are balls.

6. The birdcage assembly of claim 1 wherein said high performance vehicle is a race car.

7. The birdcage assembly of claim 6 wherein said race car is a sprint car.

8. The birdcage assembly of claim 1, further comprising:
   a securing mechanism for retaining said bearing within said birdcage and preventing said outer race of said bearing from rotating with respect to said birdcage as said rear axle rotates.

9. The birdcage assembly of claim 8 wherein said securing mechanism includes an elongated slot formed in said outer race of said bearing and a retaining mechanism extending from said birdcage and into engagement with said elongated slot.

10. The birdcage assembly of claim 1 wherein said birdcage is secured to a first end of each of a pair of torsion arms, each of said pair of torsion arms extends forward and connects to the vehicle to provide stability to the birdcage.

11. A birdcage assembly for attachment to a rear suspension of a high performance vehicle, comprising:
   a birdcage having an outer side, an inner side, an outer periphery, and an inner periphery;
   a bearing disposed in said birdcage assembly, said bearing having an outer surface in contact with said inner periphery of said birdcage, said bearing having an inner surface in rotatable communication with a rear axle of the vehicle;
   a torsion arm having a first end connected to said lower portion of said birdcage by a lower securing mechanism and a second end secured to the vehicle, said first end of said torsion arm having an outboard portion connected adjacent said outer side of said birdcage and an inboard portion connected adjacent said inner side of said birdcage;
   a first radius arm having a first end connected to said upper portion of said birdcage by an upper securing mechanism and a second end secured to the vehicle;
   whereby said birdcage is secured to the vehicle such that a center point of said lower securing mechanism and a center point of said upper securing mechanism form a line perpendicular to the ground to maintain said birdcage in a vertical position with respect to ground.

12. The birdcage assembly of claim 10 wherein said bearing includes an inner race, an outer race, and a plurality of rollers disposed between said inner race and said outer race.

13. The birdcage assembly of claim 11 wherein said plurality of rollers are balls.

14. The birdcage assembly of claim 10 wherein said bearing is moveable with respect to said birdcage away from said vertical position in response to side loads on said birdcage.

15. The birdcage assembly of claim 13 wherein said bearing is moveable with respect to said rear axle.

16. The birdcage assembly of claim 10 further comprising:
   a second radius arm having a first end connected to said upper portion of said birdcage by an upper securing mechanism and a second end secured to the vehicle.

17. The birdcage assembly of claim 10 further comprising:
   a securing mechanism for retaining said bearing within said birdcage and preventing said outer surface of said bearing from rotating with respect to said birdcage as said rear axle rotates.

18. The birdcage assembly of claim 16 wherein said securing mechanism includes an elongated slot formed in said outer surface of said bearing and a retaining mechanism extending from said birdcage and into engagement with said elongated slot.

* * * * *